US012686807B2

(12) United States Patent
Zheng et al.

(10) Patent No.: US 12,686,807 B2
(45) Date of Patent: Jul. 21, 2026

(54) MODIFIED GRAPHITE-COATED SOFT PARTICLE AND METHOD FOR PREPARING SAME, AND PROFILE CONTROL AND WATER SHUTOFF AGENT AND APPLICATION THEREOF

(71) Applicant: China University of Petroleum (East China), Qingdao (CN)

(72) Inventors: Yong Zheng, Qingdao (CN); Guang Zhao, Qingdao (CN); Caili Dai, Qingdao (CN); Dongfang Lv, Qingdao (CN); Zhe Li, Chengdu (CN); Qingfeng Liu, Qingdao (CN); Peilun Li, Qingdao (CN); Yifei Liu, Qingdao (CN); Yining Wu, Chengdu (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

(21) Appl. No.: 19/321,443

(22) Filed: Sep. 8, 2025

(65) Prior Publication Data

US 2026/0028521 A1 Jan. 29, 2026

Related U.S. Application Data

(63) Continuation of application No. 19/280,796, filed on Jul. 25, 2025, now abandoned.

(30) Foreign Application Priority Data

Jul. 25, 2024 (CN) ......................... 202411006954.3

(51) Int. Cl.
*C09K 8/487* (2006.01)

(52) U.S. Cl.
CPC .................................. *C09K 8/487* (2013.01)

(58) Field of Classification Search
CPC ........... C09K 8/487; C09K 8/48; C09K 8/516
See application file for complete search history.

(56) References Cited

U.S. PATENT DOCUMENTS 5,646,224 A * 7/1997 Kawata .................... C08K 5/09 524/554

FOREIGN PATENT DOCUMENTS

CN 105440379 A * 3/2016 ............ C08L 15/005
CN 105111531 B * 1/2017

(Continued)

OTHER PUBLICATIONS

Synthesis and Applications of Graphene Oxide, Sedmidubský, et al., Materials, 2022, 15, 920 (Year: 2022).*

(Continued)

*Primary Examiner* — Aiqun Li
(74) *Attorney, Agent, or Firm* — Calfee, Halter & Griswold LLP

(57) ABSTRACT

The present disclosure relates to the technical field of chemical profile control and water shutoff in oilfields, and discloses a modified graphite-coated soft particle and a method for preparing the same, and a profile control and water shutoff agent and an application thereof. The modified graphite-coated soft particle includes a soft particle and first modified graphite coating a surface of the soft particle. The soft particle includes one or more of a rubber main agent, an antioxidant, an auxiliary antioxidant, a density regulator, and second modified graphite. The first modified graphite and the second modified graphite are the same or different and each are modified graphite with a surface rich in hydroxyl groups and carboxyl groups. The profile control and water shutoff agent can mutually agglomerate after aging for a period upon entering a deep formation zone, and can form effective sealing of a water channeling pathway.

16 Claims, 3 Drawing Sheets

(56) References Cited

FOREIGN PATENT DOCUMENTS

| | | | | | |
|---|---|---|---|---|---|
| CN | 106554513 A | | 4/2017 | | |
| CN | 108300436 B | | 8/2020 | | |
| CN | 114163919 A | * | 3/2022 | ........... | C09D 175/14 |
| CN | 114426712 A | | 5/2022 | | |

OTHER PUBLICATIONS

TNGO technical datasheet, retrieved online 2025 (Year: 2025).*
Machine translation of CN-10540379A (Year: 2025).*
Machine translation of CN 114163919 A (Year: 2025).*
Machine translation of CN 105111531B (Year: 2025).*

* cited by examiner

MODIFIED GRAPHITE-COATED SOFT PARTICLE AND METHOD FOR PREPARING SAME, AND PROFILE CONTROL AND WATER SHUTOFF AGENT AND APPLICATION THEREOF

CROSS REFERENCE TO RELATED APPLICATIONS

This application is a continuation of U.S. application Ser. No. 19/280,796, filed on Jul. 25, 2025, which claims priority to Chinese Application No. 202411006954.3, filed on Jul. 25, 2024, entitled "Modified Graphite-Coated Soft Particle and Method for Preparing Same, and Profile Control and Water Shutoff Agent and Application Thereof", which are specifically and entirely incorporated by reference.

FIELD OF THE INVENTION

The present disclosure relates to the technical field of chemical profile control and water shutoff in oilfields, in particular to a modified graphite-coated soft particle and a method for preparing the same, and a profile control and water shutoff agent and an application thereof.

BACKGROUND OF THE INVENTION

With the development of unconventional oil and gas resources in China, an exploitation technology for deep oil reservoirs has become more and more perfect, and has become a research hotspot and strategic focus in the field of international energy. These oil reservoirs are widely distributed throughout the world, including but not limited to deep-sea sedimentary basins and deep structures in desert areas, and together they constitute a vast underexploited energy reserve on Earth. However, extreme environments of high temperature, high pressure, and high salinity pose unprecedented challenges to an existing exploration and development technology. The deep oil reservoirs have an average burial depth exceeding 4,500 meters and has characteristics such as ultrahigh pressure (>120 MPa), ultrahigh temperature (≥130° C.), and ultra-high salinity (≥20 Wmg/L). The deep oil reservoirs are usually located in zones with complex geological structures, and may contain traces of multi-phase tectonic movements, such as faults and folds. These complex geological structures affect connectivity of the oil reservoirs and mobility of fluids. The deep oil reservoirs are mainly developed by water flooding. Uneven distributions of formation porosity and permeability may lead to a complex oil-water distribution, which increases uncertainty and difficulty of exploitation and is very prone to cause water channeling. Injecting a shutoff agent into a water channeling pathway to form sealing becomes an effective way to help a further development of the deep oil reservoirs, a core of which is research and development of the shutoff agent. Rubber particles have advantages of not being diluted by formation water, having a wide range of sources, et, but problems of proneness to an oxidization failure under high temperature and high salinity, poor particle stacking and sealing effect, insufficient viscoelasticity, and difficulty in injection with low density need to be urgently tackled.

CN114426712A discloses a rubber composition based on nitrile rubber and styrene butadiene rubber and vulcanized rubber. The rubber composition includes a rubber matrix, polyvinyl chloride, carbon black, precipitated silica, an acrylic metal salt, calcium sulfate whiskers, a silane coupling agent, a vulcanizing agent, a vulcanization accelerator, a vulcanization activator, an antioxidant, and a plasticizer. The vulcanized rubber prepared by the composition has good processing properties. A product is low in shrinkage. The vulcanized rubber is good in tensile strength, tear strength and slip resistance, and is excellent in acid and alkali resistance and oil resistance. The invention does not involve research in the field of water control and oil enhancement in high-temperature and high-salt oil reservoirs.

CN106554513A discloses a nanocomposite rubber composition and vulcanized rubber. A nanocomposite contains nano-calcium carbonate modified by a modifier. The modifier is a substance containing groups A, groups B, and groups C, wherein the groups A are —S—, the groups B are —COOH, and the groups C are $—NH_2$. The nanocomposite has good dispersibility in a rubber matrix, can reinforce the rubber alone, is beneficial to vulcanization properties, mechanical properties and a processing process of a prepared rubber product, saves energy and protects the environment. However, property research of this nanocomposite rubber material is not performed under high temperature and high salinity conditions.

CN108300436B discloses an oil-water selective self-expanding rubber shutoff agent for a fractured-vuggy type oil reservoir, composed of the following raw materials by weight: 100 parts of nitrile rubber, 50-110 parts of water-absorbent resin, 5-15 parts of oil swell resin, 15-30 parts of reinforcing agents, 0.5-2 parts of softeners, 2-5 parts of accelerators, 3-6 parts of zinc oxide, and 0.5-3.5 parts of vulcanizing agents. The water-absorbent resin is one of sodium polystyrene sulfonate, sodium polyvinyl sulfonate, or sodium polyallyl sulfonate or a mixture thereof. The oil swell resin is one of hydrogenated petroleum resin, phenolic resin, styrene butadiene rubber, or polyethylene resin or a mixture thereof. The vulcanized rubber is benzoyl peroxide, dicumyl peroxide, or a mixture thereof. The reinforcing agent is carbon black 550, precipitated silica, or a mixture thereof. The softener is stearic acid. The accelerator is zinc oxide. The shutoff agent has property characteristics of high mechanical strength, strong resistance to salinity, high toughness, high volume expansion ratio, etc. A sealing mechanism is particle expansion scaling. An application range of the patent is oil reservoirs with a burial depth of 5400 m-6600 m, a temperature of 120° C.-140° C., and a salinity of ≤$20\times10^4$ mg/L.

Therefore, there is an urgent need to develop modified graphite-coated soft particles that are resistant to thermal oxidation, are suspended in formation water, slowly agglomerate at a high temperature, and are high in sealing strength, so as to meet requirements of water control and oil enhancement in high-temperature and high-salt oil reservoirs.

SUMMARY OF THE INVENTION

An objective of the present disclosure is to solve defective problems of the prior art that an existing rubber particle regulator for a high-temperature and high-salt (≥140° C., salinity ≥200,000 mg/L) oil reservoir is prone to an oxidation failure in a high-temperature and high-salt formation, low-density floating and too quick an agglomeration are not conducive to a deep injection, and a lack of agglomeration capacity leads to a poor capacity for deep scaling, and provide a modified graphite-coated soft particle and a method for preparing the same, and a profile control and water shutoff agent and an application thereof. The profile control and water shutoff agent can agglomerate after aging for a period upon entering a deep formation zone, can form effective sealing of a water channeling pathway, and can effectively expand an effect.

In order to achieve the above objective, a first aspect of the present disclosure provides a modified graphite-coated soft particle, including a soft particle and first modified graphite coating a surface of the soft particle. The soft particle includes one or more of a rubber main agent, an antioxidant, an auxiliary antioxidant, a density regulator, and second modified graphite. The first modified graphite and the second modified graphite are the same or different and each are modified graphite with a surface rich in hydroxyl groups and carboxyl groups.

A second aspect of the present disclosure provides a method for preparing the modified graphite-coated soft particle as previously described, including:

(1) bringing a rubber main agent, an antioxidant, an auxiliary antioxidant, second modified graphite, and a density regulator into contact for melt mixing to obtain integral rubber;

(2) performing crushing, shearing, and extrusion granulation on the integral rubber to obtain soft particles; and (3) mixing first modified graphite and water to obtain a first modified graphite dispersion, bringing the first modified graphite dispersion and the soft particles into contact, and causing the first modified graphite to adhere to surfaces of the soft particles under conditions of heating and rotation to obtain modified graphite-coated soft particles.

A third aspect of the present disclosure provides a profile control and water shutoff agent. The profile control and water shutoff agent is the modified graphite-coated soft particle as previously described.

A fourth aspect of the present disclosure provides an application of the profile control and water shutoff agent as previously described in an oil reservoir.

Through the above technical solution, the present disclosure has the following beneficial effects.

(1) The profile control and water shutoff agent of the present disclosure can be resistant to thermal oxidation without a failure in a high-temperature and high-salt formation environment, and a validity duration is ≥90 days, which can ensure long-term effectiveness of control shutoff operation.

(2) The profile control and water shutoff agent of the present disclosure has higher viscoelasticity than ordinary rubber particles, and has an agglomeration capacity and higher blocking strength.

(3) The profile control and water shutoff agent of the present disclosure has a density similar to that of formation water, and the density may be regulated according to an actual density of the formation water. The profile control and water shutoff agent has a slow agglomeration capacity at a high temperature, and starts to agglomerate only after aging for 2 d at the high temperature. A particle size is regulable from 200 μm to 3.5 mm, and an injection property is good, so as to prevent damage to the reservoir.

(4) The profile control and water shutoff agent of the present disclosure has good compatibility with water, and is easy to prepare, and injection allocation may be performed with clean water or with high-salinity oil-field reinjection water, which alleviates a problem of a shortage of fresh water resources in complex and harsh construction processes in a desert, Gobi, ocean, etc.

DETAILED DESCRIPTION OF THE EMBODIMENTS

Figure 1:
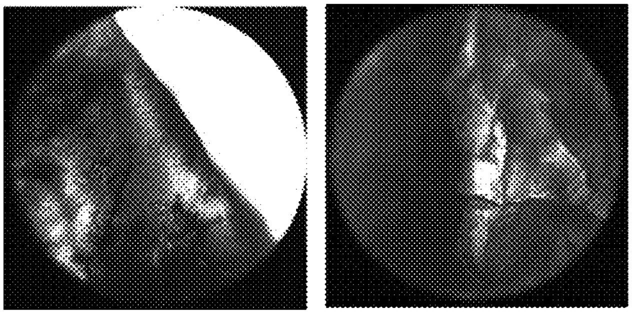
FIG. 1 is a microscopic photograph of an agglomeration at a high temperature of a temperature-resistant and salt-resistant modified graphite-coated soft particle prepared using ethylene propylene diene monomer as a main agent in Example 1 of the present disclosure.

Endpoints of ranges and any values disclosed herein are not limited to the precise ranges or values, and these ranges or values should be understood to contain values close to these ranges or values. For numerical ranges, endpoint values of individual ranges may be combined with each other, endpoint values of individual ranges and individual point values may be combined with each other, and individual point values may be combined with each other, to obtain one or more new numerical ranges, and these numerical ranges should be regarded as specifically disclosed herein.

As previously described, a first aspect of the present disclosure provides a modified graphite-coated soft particle, including a soft particle and first modified graphite coating a surface of the soft particle. The soft particle includes one or more of a rubber main agent, an antioxidant, an auxiliary antioxidant, a density regulator, and second modified graphite. The first modified graphite and the second modified graphite are the same or different and each are modified graphite with a surface rich in hydroxyl groups and carboxyl groups.

The inventor of the present disclosure finds that (1) the adoption of the modified graphite (the first modified graphite and/or the second modified graphite) as an enhancer can enhance stability of the rubber particle at a high temperature and high salt, which is conducive to sustained scaling of the rubber particle; (2) at the high temperature, the surface-coated soft particle can retard an agglomeration between the rubber particles, and prevent damage to a reservoir caused by too quick an agglomeration of the rubber particles at the high temperatures and high salt; (3) Enhancing viscoelasticity of the particles helps to improve a sealing effect; and (4) the carboxyl groups and hydroxyl groups in the modified graphite can improve hydrophilicity of the rubber particles and electrostatic repulsion between the particles, and assist in density regulation of the rubber particles, which helps the rubber particles to be evenly dispersed in formation water and efficiently injected.

According to the present disclosure, a thickness of the first modified graphite coating the surface of the soft particle is 30 nm-50 μm, preferably 80 nm-20 μm.

According to the present disclosure, based on a total weight of the soft particle, a content of the rubber main agent is 65 wt %-85 wt %, a content of the antioxidant is 0.1 wt %-0.5 wt %, a content of the auxiliary antioxidant is 0.05 wt %-0.3 wt %, a content of the second modified graphite is 5 wt %-10 wt %, and a content of the density regulator is 4 wt %-30 wt %. Preferably, based on the total weight of the soft particle, the content of the rubber main agent is 70 wt %-80 wt %, the content of the antioxidant is 0.15 wt %-0.3 wt %, the content of the auxiliary antioxidant is 0.1 wt %-0.2 wt %, the content of the second modified graphite is 7.5 wt %-9 wt %, and the content of the density regulator is 10 wt %-25 wt %, more preferably 12.8 wt %-18.6 wt %. More preferably, based on the total weight of the soft particle, the content of the rubber main agent is 74 wt %-77 wt %, the content of the antioxidant is 0.15 wt %-0.3 wt %, the content of the auxiliary antioxidant is 0.1 wt %-0.2 wt %, the content of the second modified graphite is 7.5 wt %-8.7 wt %, and the content of the density regulator is 14 wt %-17 wt %.

In the present disclosure, if the content of the second modified graphite (enhancer) is too high, it leads to a defect that the soft particles cannot agglomerate, which seriously affects the sealing effect. If the content of the second modified graphite (enhancer) is too low, it leads to a defect that the soft particles agglomerate too quickly, which results in damage to a near-shaft reservoir.

In the present disclosure, it needs to be noted that a total content of the rubber main agent, the antioxidant, the auxiliary antioxidant, the density regulator, and the second modified graphite in the soft particle is 100%.

According to the present disclosure, the first modified graphite and the second modified graphite are the same or different and each are modified graphite with a surface rich in hydroxyl groups and carboxyl groups. The modified graphite contains oxygen-containing groups, the oxygen-containing groups include hydroxyl groups, carboxyl groups, and epoxy groups, and based on the total number of the oxygen-containing groups of the modified graphite, the hydroxyl groups account for 30%-60% of the oxygen-containing groups in the modified graphite, the carboxyl groups account for 10%-30% of the oxygen-containing groups in the modified graphite, and the number of the epoxy groups accounts for 30%-40%. Preferably, based on the total number of the oxygen-containing groups of the modified graphite, the hydroxyl groups account for 45%-55% of the oxygen-containing groups in the modified graphite, the carboxyl groups account for 20%-30% of the oxygen-containing groups in the modified graphite, and the epoxy groups account for 20%-30% of the oxygen-containing groups in the modified graphite. In the present disclosure, the sum of proportions of the numbers of the hydroxyl groups, the carboxyl groups, and the epoxy groups is 100%.

In the present disclosure, a structure of the modified graphite may be as shown in a schematic diagram of a formula (1). However, it needs to be noted that the hydroxyl groups and the carboxyl groups represented in the formula (1) are not limited to the numbers shown in formula (1);

formula (1)

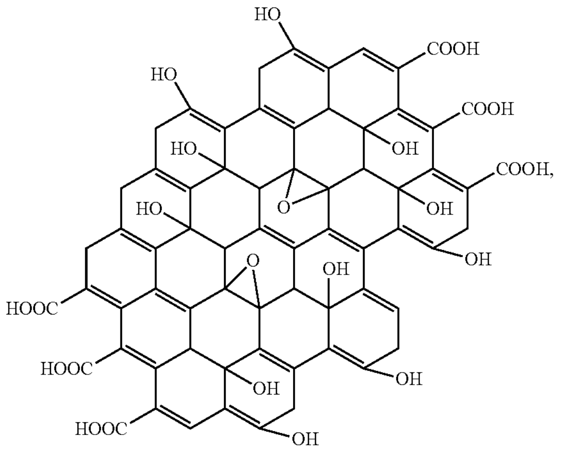

According to the present disclosure, a particle size of the modified graphite is 200 nm-1000 nm, preferably 300 nm-800 nm, more preferably, the particle size of the modified graphite is 300 nm-500 nm, and/or, the particle size of the modified graphite is 500 nm-800 nm.

In the present disclosure, according to a particularly preferred embodiment, the modified graphite is self-made in a laboratory from natural graphite via a Hummers oxidation method, specifically:

(1) Low-Temperature Reaction Phase:

a 250 mL three-neck flask was assembled in an ice-water bath, an appropriate amount of concentrated sulfuric acid was added, a solid mixture of 1 g-5 g (preferably 2 g) of natural nano-graphite powder and 1 g-3 g (preferably 1 g) of sodium nitrate was added with stirring, then 5 g-10 g (preferably 6 g) of potassium permanganate was added in stages, a reaction temperature was controlled to be lower than −5° C.-5° C. (preferably 3° C.), and a reaction was performed with stirring for 30 min-60 min (preferably 45 min);

(2) Medium-Temperature Reaction Phase:

the temperature was increased to about 25° C.-50° C. (preferably 35° C.), and stirring was continued for 30 min-60 min (preferably 45 min);

(3) High-Temperature Reaction Phase:

subsequently, a certain amount of deionized water was added dropwise, and a reaction was performed with stirring for 15 min-30 min (preferably 20 min), followed by addition of a hydrogen peroxide reducing agent to reduce a residual oxidizing agent in a solution, so as to give the solution a bright yellow color; subsequently, a dispersion was centrifuged and filtered; and the washed solution was dried in an oven at 30° C.-50° C. (preferably 35° C.), and grinding and dispersing were performed to obtain modified graphite particles.

In the examples of the present disclosure, the adopted modified graphite particles are modified graphite particles prepared using the preferred conditions described above.

According to the present disclosure, the first modified graphite (enhancer) may form coating films on the surfaces of the rubber particles, which serves to retard the agglomeration of the rubber particles and enhance the viscoelasticity of the particles, and secondly may also assist the density regulation. Hydrophilic groups on the surfaces thereof improve the hydrophilicity of the particles and electric repulsion between the particles, and an effective agglomeration after reaching a deep formation zone realizes effective sealing of the channeling pathway.

According to the present disclosure, the rubber main agent is selected from one or more of natural rubber, styrene butadiene rubber, and ethylene propylene diene monomer. The rubber main agent has excellent viscoelasticity and is a core of sealing the water channeling pathway.

According to the present disclosure, the antioxidant is selected from pentaerythritol bis(2,6-di-tert-butyl-p-cresol) ester and/or pentaerythritol tetrakis[3-(3,5-di-tert-butyl-4-hydroxyphenyl)propionate]. The antioxidant can provide one hydrogen atom to a free radical, converting itself into a relatively stable free radical. This process can interrupt a free radical chain reaction, preventing a rubber molecule from being further oxidized and damaged. Since a hindered phenol free radical is stable, it is less prone to triggering a new oxidation reaction, thus effectively preventing oxidation progress.

According to the present disclosure, the auxiliary antioxidant is tris(2,4-di-tert-butylphenyl)phosphite. The auxiliary antioxidant is used in synergy with the antioxidant to improve long-term thermal stability of a rubber material.

According to the present disclosure, the antioxidant and the auxiliary antioxidant can effectively prevent the particles from an oxidation failure under the action of high temperature and oxygen.

According to the present disclosure, the density regulator is ceramic sand and/or steel shots. The ceramic sand is spherical and has a density of 3 g/cm$^3$-4 g/cm$^3$, preferably 3.85 g/cm$^3$. Preferably, a particle size of the ceramic sand is 45μ-90 μm. The steel shots are spherical and have a density of 7 g/cm$^3$-7.5 g/cm$^3$, preferably 7.2 g/cm$^3$. Preferably, a particle size of the steel shots is 45μ-75 μm. The density regulator can regulate the density of the rubber particles according to a salinity of formation water to make it similar to the density of the formation water, achieving a purpose of suspension in the formation water, which is conducive to sustained deep injection under conditions of different salinities of the formation water. That is, the density regulator can regulate the density of the rubber particles to ensure that the soft particles are suspended in a water body, which helps the water body to carry them into the interior of the formation.

According to the present disclosure, a particle size of the modified graphite-coated soft particle is 200 μm-3.5 mm; and preferably, the particle size of the modified graphite-coated soft particle is 500 μm-2 mm.

A second aspect of the present disclosure provides a method for preparing the modified graphite-coated soft particle as previously described, including:

(1) bringing a rubber main agent, an antioxidant, an auxiliary antioxidant, second modified graphite, and a density regulator into contact for melt mixing to obtain integral rubber;

(2) performing crushing, shearing, and extrusion granulation on the integral rubber to obtain soft particles; and (3) mixing first modified graphite and water to obtain a first modified graphite dispersion, bringing the first modified graphite dispersion and the soft particles into contact, and causing the first modified graphite to adhere to surfaces of the soft particles under conditions of heating and rotation to obtain modified graphite-coated soft particles.

According to the present disclosure, in step (1), a twin-screw extruder brings the rubber main agent, the antioxidant, the auxiliary antioxidant, an enhancer, and the density regulator into contact for melt mixing at 250° C. Specifically, a condition for the melt mixing includes: a temperature of 180° C.-350° C., preferably 200° C.-250° C.

According to the present disclosure, preferably, step (1) may be repeatedly operated 2-3 times to ensure that the antioxidant, the auxiliary antioxidant, the enhancer, and the density regulator may be evenly dispersed in the rubber main agent.

According to the present disclosure, in step (2), a temperature-resistant and salt-resistant modified graphite-coated soft body is put into a low-temperature crushing granulator to obtain the temperature-resistant and salt-resistant modified graphite-coated soft particles, and the soft particles obtained are regulable from 200 μm to 3.5 mm.

According to the present disclosure, the twin-screw extruder known to those skilled in the art may be adopted. A condition of extrusion granulation includes: a temperature of 180° C.-350° C., preferably 200° C.-220° C.

According to the present disclosure, in step (3), a concentration of the first modified graphite dispersion is 0.1%-1%.

According to the present disclosure, in step (3), a weight ratio of the amount of the first modified graphite dispersion to the amount of the soft particles is 100:(2-20), preferably 100:(10-15).

According to the present disclosure, in step (3), the conditions of the heating and rotation include: a temperature of 180° C.-200° C. and a rotation rate of 50 rpm-150 rpm.

A third aspect of the present disclosure provides a profile control and water shutoff agent. The profile control and water shutoff agent is the modified graphite-coated soft particle as previously described.

According to the present disclosure, the profile control and water shutoff agent has a density similar to that of simulated formation water. Preferably, the density of the profile control and water shutoff agent is 1.0 g/cm$^3$-1.2 g/cm$^3$.

According to the present disclosure, the profile control and water shutoff agent is well dispersed in the formation water, can be injected into a deep zone under the action of a high temperature and then agglomerate, has good viscoelasticity, and has strong long-term stability under the high temperature and high salt.

According to the present disclosure, the profile control and water shutoff agent has a structure with the soft particle as a core and the first modified graphite coating the outside of the core. Preferably, the soft particle contains one or more of a rubber main agent, an antioxidant, an auxiliary antioxidant, a density regulator, and second modified graphite.

According to the present disclosure, the profile control and water shutoff agent is the modified graphite-coated soft particle.

According to the present disclosure, a particle size of the profile control and water shutoff agent is 200 μm-3.5 mm. Preferably, the particle size of the profile control and water shutoff agent is 500 μm-2 mm.

According to the present disclosure, the profile control and water shutoff agent has an elastic modulus of 700 kPa-800 kPa and a viscous modulus of 350 kPa-450 kPa at 140° C. and under a condition of a salinity of $20\times10^4$ mg/L.

A fourth aspect of the present disclosure provides an application of the profile control and water shutoff agent as previously described in an oil reservoir.

According to the present disclosure, the application includes: agglomeration and then sealing of particles of the profile control and water shutoff agent in the oil reservoir.

According to the present disclosure, conditions of the oil reservoir include: a depth of ≥4500 m, a temperature of ≥140° C., and a salinity of ≥$20\times10^4$ mg/L. Preferably, the conditions of the oil reservoir include: a depth of 4500 m-6500 m, a temperature of 140° C.-200° C., and a salinity of $20\times10^4$ mg/L to $30\times10^4$ mg/L.

The present disclosure will be described in detail below through examples.

In the following examples and comparative examples:

a microscopic agglomeration diagram of the soft particle was measured using a microscope;

thermal stability was measured by differential scanning calorimetry;

viscous and elastic modulus parameters were measured by a high temperature viscoelastic testing method using a rheometer;

a rock core sealing ratio parameter was measured by a fracture core flooding experimental method at high temperature and high salt;

the rheometer was purchased from the Haake manufacturer, model Haake Rheostree RS75;

the microscope was purchased from Leica Microsystems Co., LTD., model Leica DMi8 C;

ceramic sand and steel shots are commercially available from Lianzhiyan Surface Treatment Material Co., LTD.;

ethylene propylene diene monomer, styrene butadiene rubber, and natural rubber are commercially available from Hengshui Mingguan Rubber & Plastic Products Co., LTD.; and an antioxidant and an auxiliary antioxidant are commercially available from Shanghai Yuanye Biotechnology Co., LTD.

Example 1

The present disclosure aims to illustrate preparation of a temperature-resistant and salt-resistant modified graphite-coated soft particle (i.e., a profile control and water shutoff agent) of the present disclosure.

The soft particle includes: a rubber main agent, ethylene propylene diene monomer, mass fraction 75%; an antioxidant, pentaerythritol bis(2,6-di-tert-butyl-p-cresol) ester, mass fraction 0.3%; an auxiliary antioxidant, tris(2,4-di-tert-butylphenyl)phosphite, mass fraction 0.2%; an enhancer, modified graphite (second modified graphite), 300 nm-500 nm, mass fraction 7.5%; and a density regulator, ceramic sand, 45 μm, mass fraction 17%. The sum of mass fractions of all the components is 100%.

Modified graphite (first modified graphite) of 300 nm-500 nm is provided. A weight ratio of the amount of a first modified graphite dispersion to the amount of the soft particles is 100:10.

In addition, a structure of the modified graphite may be as shown in the schematic diagram of formula (1) in the specification. Specifically, based on a total number of oxygen-containing groups of the modified graphite, in the modified graphite, the number of hydroxyl groups accounts for 48%, the number of carboxyl groups accounts for 28%, and the number of epoxy groups accounts for 24%.

(1) Under a condition of 250° C. in a twin-screw extruder, 75 g rubber particles, 0.3 g antioxidant, 0.2 g auxiliary antioxidant, 7.5 g enhancer (second modified graphite), and 17 g density regulator were brought into contact into the twin-screw extruder for melt mixing, the operation was repeated three times to ensure even mixing, and 100 g integral rubber was obtained.

(2) The integral rubber was then put into a low-temperature crushing granulator for fixed-scale low-temperature shearing to obtain temperature-resistant and salt-resistant soft particles of a certain particle size.

(3) 100 g modified graphite (first modified graphite) dispersion with a concentration of 0.1% and 10 g soft particles were loaded into a roller together, the modified graphite was made to adhere to the surfaces of the soft particles under conditions of heating and rotation (180° C., 100 rpm) to obtain modified graphite-coated soft particles, wherein a particle size of the modified graphite-coated soft particles is 0.3 mm-0.5 mm, and the modified graphite-coated soft particle includes a soft particle and first modified graphite coating the surface of the soft particle. A thickness of the first modified graphite coating the surface of the soft particle is 120 nm.

The modified graphite-coated soft particle was put into an oven at 130° C. for aging as a profile control and water shutoff agent. It was found that the profile control and water shutoff agent particles did not settle and were not suspended in 200,000 mg/L simulated formation water, and started to agglomerate obviously at 48 h. The clastic modulus was 790.30 kPa and the viscous modulus was 434.04 kPa at 140° C. and under a condition of a salinity of $20\times10^4$ mg/L. No damage to an agglomerate occurred after 90 days of aging.

Figure 6:
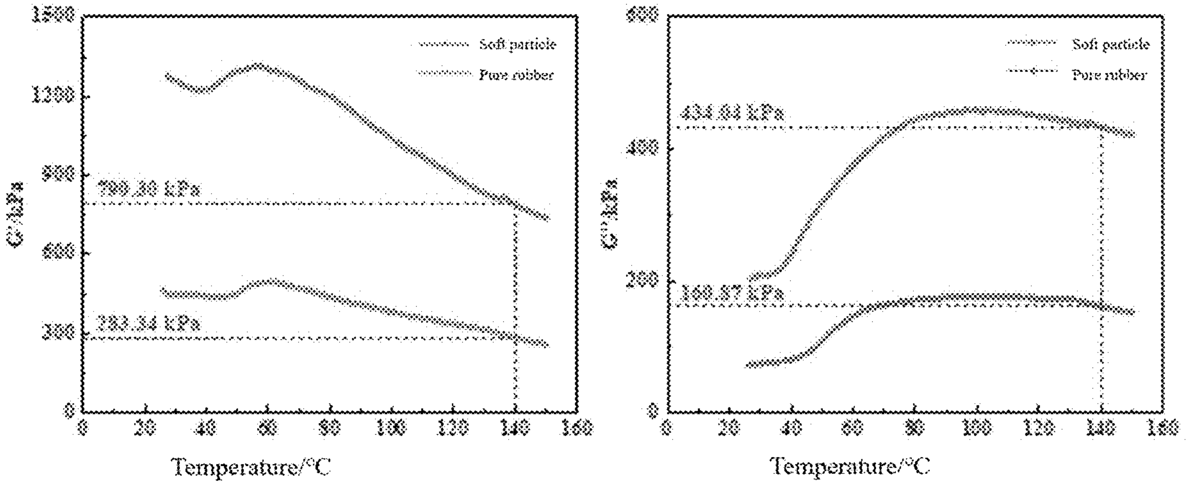
FIG. 6 shows testing results of an elastic modulus and a viscous modulus at 25° C.-150° C. of a temperature-resistant and salt-resistant modified graphite-coated soft particle prepared using ethylene propylene diene monomer as a main agent in Example 1.

FIG. 6 shows testing results of elastic moduli and viscous moduli at 25° C.-150° C. of a temperature-resistant and salt-resistant modified graphite-coated soft particle prepared using ethylene propylene diene monomer as a main agent in Example 1 and a pure ethylene propylene diene monomer matrix. A diagram on the left indicates the elastic moduli, and a diagram on the right indicates the viscous moduli. After mixing, the rubber particles were still mainly elastic. Elasticity was improved by 2.6 times and viscosity was improved by 2.5 times compared with those of a pure rubber matrix, which reflected good viscoelasticity of the temperature-resistant and salt-resistant modified graphite-coated soft particles at a high temperature, which helped to improve a sealing effect.

Example 2

The present disclosure aims to illustrate preparation of a temperature-resistant and salt-resistant modified graphite-coated soft particle (i.e., a profile control and water shutoff agent) of the present disclosure.

The soft particle includes: a rubber main agent, styrene butadiene rubber, mass fraction 74%; an antioxidant, pentaerythritol bis(2,6-di-tert-butyl-p-cresol) ester, mass fraction 0.2%; an auxiliary antioxidant, tris(2,4-di-tert-butylphenyl)phosphite, mass fraction 0.1%; an enhancer, modified graphite (second modified graphite), 500 nm-800 nm, mass fraction 8.7%; and a density regulator, ceramic sand, 60 μm, mass fraction 17%. The sum of mass fractions of all the components is 100%.

Modified graphite (first modified graphite) of 500 nm-800 nm is provided. A weight ratio of the amount of a first modified graphite dispersion to the amount of the soft particles is 100:10.

In addition, a structure of the modified graphite may be as shown in the schematic diagram of formula (1) in the specification. Specifically, based on a total number of oxygen-containing groups of the modified graphite, in the modified graphite, the number of hydroxyl groups accounts for 51%, the number of carboxyl groups accounts for 25%, and the number of epoxy groups accounts for 24%.

(1) Under a condition of 250° C. in a twin-screw extruder, 74 g rubber particles, 0.2 g antioxidant, 0.1 g auxiliary antioxidant, 8.7 g enhancer (second modified graphite), and 17 g density regulator were brought into contact into the twin-screw extruder for melt mixing, the operation was repeated three times to ensure even mixing, and 100 g integral rubber with a density equal to that of simulated formation water with a salinity of 200,000 mg/L (wherein 73282 mg/L sodium ions, 6000 mg/L calcium ions, and 1000 mg/L magnesium ions) was obtained.

(2) The integral rubber was then put into a low-temperature crushing granulator for fixed-scale low-temperature shearing to obtain temperature-resistant and salt-resistant soft particles of a certain particle size.

(3) 100 g modified graphite (first modified graphite) dispersion with a concentration of 0.1% and 10 g soft particles were loaded into a roller together, the modified graphite was made to adhere to the surfaces of the soft particles under conditions of heating and rotation (200° C., 150 rpm) to obtain modified graphite-coated soft particles, wherein a particle size of the modified graphite-coated soft particles is 0.5 mm-1.0 mm, and the modified graphite-coated soft particle includes a soft particle and first modified graphite coating the surface of the soft particle. A thickness of the first modified graphite coating the surface of the soft particle is 1 μm.

The modified graphite-coated soft particles were put into an oven at 130° C. for aging as a profile control and water shutoff agent. It was found that the particles did not settle and were not suspended in 200,000 mg/L simulated formation water, and started to agglomerate obviously at 48 h. The elastic modulus was 730.81 kPa and the viscous modulus was 401.34 kPa at 140° C. and under a condition of a salinity of $20\times10^4$ mg/L. No damage to an agglomerate occurred after 90 days of aging.

Example 3

The present disclosure aims to illustrate preparation of a temperature-resistant and salt-resistant modified graphite-coated soft particle (i.e., a profile control and water shutoff agent) of the present disclosure.

The soft particle includes: a rubber main agent, natural rubber, mass fraction 77%; an antioxidant, pentaerythritol tetrakis[3-(3,5-di-tert-butyl-4-hydroxyphenyl)propionate], mass fraction 0.15%; an auxiliary antioxidant, tris(2,4-di-tert-butylphenyl)phosphite, mass fraction 0.15%; an enhancer, modified graphite (second modified graphite), 500 nm-800 nm, mass fraction 8.7%; and a density regulator, steel shots, 90 μm, mass fraction 14%. The sum of mass fractions of all the components is 100%.

Modified graphite (first modified graphite) of 500 nm-800 nm is provided. A weight ratio of the amount of the first modified graphite to the amount of the soft particles is 100:10.

In addition, a structure of the modified graphite may be as shown in the schematic diagram of formula (1) in the specification. Specifically, based on a total number of oxygen-containing groups of the modified graphite, in the modified graphite, the number of hydroxyl groups accounts for 52%, the number of carboxyl groups accounts for 24%, and the number of epoxy groups accounts for 24%.

(1) Under a condition of 250° C. in a twin-screw extruder, 77 g rubber particles, 0.15 g antioxidant, 0.15 g auxiliary antioxidant, 8.7 g enhancer (second modified graphite), and 14 g density regulator were brought into contact into the twin-screw extruder for melt mixing, the operation was repeated three times to ensure even mixing, and 100 g integral rubber with a density equal to that of simulated formation water with a salinity of 200,000 mg/L (wherein 73282 mg/L sodium ions, 6000 mg/L calcium ions, and 1000 mg/L magnesium ions) was obtained.

(2) The integral rubber was then put into a low-temperature crushing granulator for fixed-scale low-temperature shearing to obtain temperature-resistant and salt-resistant soft particles of a certain particle size.

(3) 100 g modified graphite (first modified graphite) dispersion with a concentration of 0.1% and 100 g soft particles were loaded into a roller together, the modified graphite was made to adhere to the surfaces of the soft particles under conditions of heating and rotation (200° C., 150 rpm) to obtain modified graphite-coated soft particles, wherein a particle size of the modified graphite-coated soft particles is 1.0 mm-1.6 mm, and the modified graphite-coated soft particle includes a soft particle and first modified graphite coating the surface of the soft particle. A thickness of the first modified graphite coating the surface of the soft particle is 500 nm.

The modified graphite-coated soft particles were put into an oven at 130° C. for aging as a profile control and water shutoff agent. It was found that the particles did not settle and were not suspended in 200,000 mg/L simulated formation water, and started to agglomerate obviously at 48 h. The clastic modulus was 692.38 kPa and the viscous modulus was 387.22 kPa at 140° C. and under a condition of a salinity of $20\times10^4$ mg/L. No damage to an agglomerate occurred after 90 days of aging.

Figure 2:
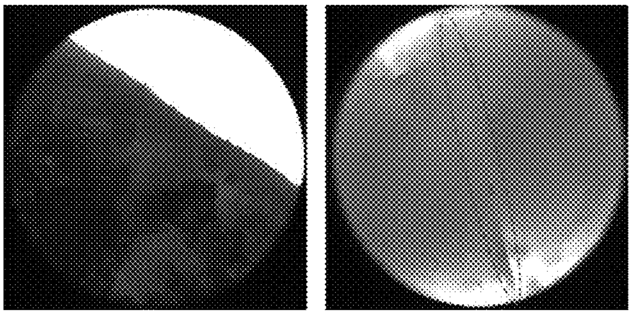
FIG. 2 is a microscopic photograph of an agglomeration at a high temperature of a temperature-resistant and salt-resistant modified graphite-coated soft particle prepared using styrene butadiene rubber as a main agent in Example 2 of the present disclosure.
Figure 3:
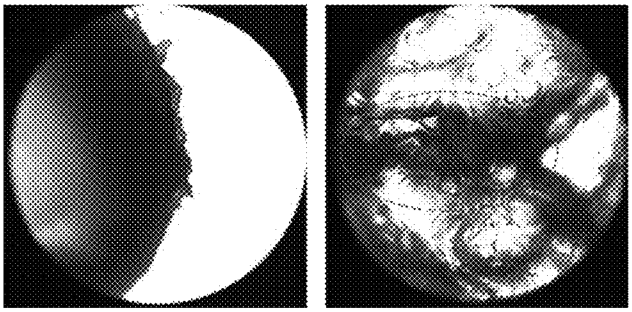
FIG. 3 is a microscopic photograph of an agglomeration at a high temperature of a temperature-resistant and salt-resistant modified graphite-coated soft particle prepared using natural rubber as a main agent in Example 3 of the present disclosure.

FIG. 1 is a microscopic photograph of a temperature-resistant and salt-resistant modified graphite-coated soft particle prepared using ethylene propylene diene monomer as a main agent prepared in Example 1 of the present disclosure before and after an agglomeration at a high temperature. FIG. 2 is a microscopic photograph of an agglomeration at a high temperature of a temperature-resistant and salt-resistant modified graphite-coated soft particle prepared using styrene butadiene rubber as a main agent prepared in Example 2 of the present disclosure. FIG. 3 is a microscopic photograph of an agglomeration at a high temperature of a temperature-resistant and salt-resistant modified graphite-coated soft particle prepared using natural rubber as a main agent prepared in Example 1 of the present disclosure. It needs to be noted that in FIGS. 1-3, the diagrams on the left all indicate that interfaces of the coated soft particles are clear before an agglomeration, and the diagrams on the right all indicate that the interfaces undergo a significant mutual agglomeration after the bagglomeration. From FIGS. 1, 2 and 3, it can be seen that: the interfaces between the particles start to agglomerate after the rubber particles are aged at a high temperature for 2 d, and single small particles turn into large-size agglomerated multi-particles, which can seal a fracture of a larger scale.

Figure 4:
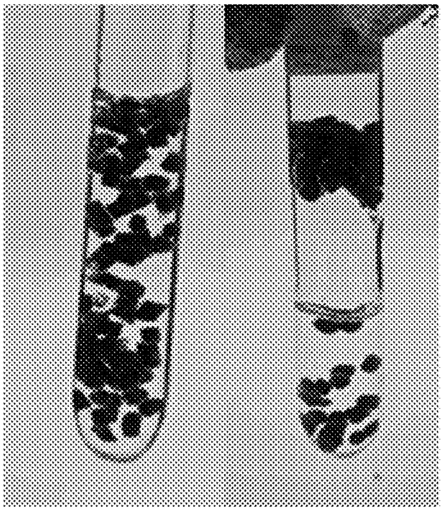
FIG. 4 is a macroscopic schematic diagram of temperature-resistant and salt-resistant modified graphite-coated soft particles prepared in Example 3 of the present disclosure before and after an agglomeration at a high temperature.

FIG. 4 is a macroscopic schematic diagram of temperature-resistant and salt-resistant modified graphite-coated soft particles prepared in Example 3 of the present disclosure before and after an agglomeration at a high temperature. The diagram on the left shows that the coated soft particles are dispersed in water, and the diagram on the right shows that the particles agglomerate at a high temperature to form effective sealing for a water body, from which it may be seen that the rubber particles after an agglomeration may indeed effectively seal the water body.

Figure 7:
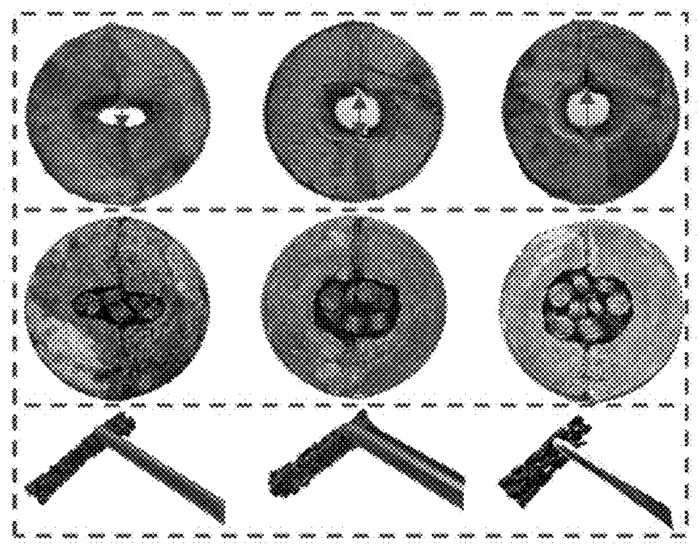
FIG. 7 is a physical drawing of sealing formed after an agglomeration of temperature-resistant and salt-resistant modified graphite-coated soft particles prepared in Examples 1, 2, and 3 respectively in rock cores with fracture scales of 5 mm, 8 mm, and 10 mm.

FIG. 7 is a physical drawing of sealing formed after an agglomeration of temperature-resistant and salt-resistant modified graphite-coated soft particles prepared in Examples 1, 2, and 3 respectively in rock cores with fracture scales of 5 mm, 8 mm, and 10 mm. As can be seen in FIG. 7: the temperature-resistant and salt-resistant modified graphite-coated soft particles form effective sealing within fractures of different scales.

Example 4

The present disclosure aims to illustrate preparation of a temperature-resistant and salt-resistant modified graphite-coated soft particle (i.e., a profile control and water shutoff agent) of the present disclosure.

Temperature-resistant and salt-resistant modified graphite-coated soft particles were prepared according to a method the same as that in Example 1, with the difference that:

the soft particle includes: a rubber main agent, ethylene propylene diene monomer, mass fraction 62.2 wt %; an antioxidant, pentaerythritol bis(2,6-di-tert-butyl-p-cresol) ester, mass fraction 0.5 wt %; an auxiliary antioxidant, tris(2,4-di-tert-butylphenyl)phosphite, mass fraction 0.3 wt %; an enhancer (second modified graphite), modified graphite 500 nm-1000 nm, mass fraction 10 wt %; and a density regulator, ceramic sand, 45 μm, mass fraction 27 wt %. The sum of mass fractions of all the components is 100%.

Modified graphite (first modified graphite) of 500 nm-1000 nm is provided. A weight ratio of the amount of a first modified graphite dispersion to the amount of the soft particles is 100:10.

In addition, a structure of the modified graphite may be as shown in the schematic diagram of formula (1) in the specification. Specifically, based on a total number of oxygen-containing groups of the modified graphite, in the modified graphite, the number of hydroxyl groups accounts for 57%, the number of the carboxyl groups accounts for 11%, and the number of the epoxy groups accounts for 32%.

As a result, modified graphite-coated soft particles are obtained. A particle size of the modified graphite-coated soft particles is 0.3 mm-0.5 mm, and the modified graphite-coated soft particle includes a soft particle and first modified graphite coating the surface of the soft particle. A thickness of the first modified graphite coating the surface of the soft particle is 50 nm.

Example 5

The present disclosure aims to illustrate preparation of a temperature-resistant and salt-resistant modified graphite-coated soft particle (i.e., a profile control and water shutoff agent) of the present disclosure.

Temperature-resistant and salt-resistant modified graphite-coated soft particles were prepared according to a method the same as that in Example 1, with the difference that:

The soft particle includes: a rubber main agent, ethylene propylene diene monomer, mass fraction 82%; an antioxidant, pentaerythritol bis(2,6-di-tert-butyl-p-cresol) ester, mass fraction 0.3%; an auxiliary antioxidant, tris(2,4-di-tert-butylphenyl)phosphite, mass fraction 0.1%; an enhancer, modified graphite (second modified graphite), 300 nm-500 nm, mass fraction 5%; and a density regulator, ceramic sand, 45 μm, mass fraction 12.6%. The sum of mass fractions of all the components is 100%.

Modified graphite (first modified graphite) of 300 nm-500 nm is provided. A weight ratio of the amount of a first modified graphite dispersion to the amount of the soft particles is 100:10.

In addition, a structure of the modified graphite may be as shown in the schematic diagram of formula (1) in the specification. Specifically, based on a total number of oxygen-containing groups of the modified graphite, in the modified graphite, the number of hydroxyl groups accounts for 55%, the number of the carboxyl groups accounts for 12%, and the number of the epoxy groups accounts for 33%.

As a result, modified graphite-coated soft particles are obtained. A particle size of the modified graphite-coated soft particles is 0.3 mm-0.5 mm, and the modified graphite-coated soft particle includes a soft particle and first modified graphite coating the surface of the soft particle. A thickness of the first modified graphite coating the surface of the soft particle is 30 nm.

Application Example 1

The present disclosure further provides a method for applying a temperature-resistant and salt-resistant modified graphite-coated soft particle as a profile control and water shutoff agent. The temperature-resistant and salt-resistant modified graphite-coated soft particles of 0.3 mm-0.5 mm prepared in Example 1 were selected for a fracture sealing experiment, a salinity of simulated formation water was 200,000 mg/L (wherein 73282 mg/L sodium ions, 6000 mg/L calcium ions, and 1000 mg/L magnesium ions), the size of a rock core fracture was 5 mm, an injection volume was 1 FV, an injection aging temperature was 150° C., an aging time was 48 h, permeability was $2.69\times10^6$ mD before sealing, and permeability was 31.58 mD after injection.

Application Example 2

The present disclosure further provides a method for applying a temperature-resistant and salt-resistant modified graphite-coated soft particle as a profile control and water shutoff agent. The temperature-resistant and salt-resistant modified graphite-coated soft particles of 0.5 mm-1.0 mm prepared in Example 2 were selected for a fracture sealing experiment, a salinity of simulated formation water was 200,000 mg/L (wherein 73282 mg/L sodium ions, 6000 mg/L calcium ions, and 1000 mg/L magnesium ions), the size of a rock core fracture was 8 mm, an injection volume was 1 FV, an injection aging temperature was 150° C., an aging time was 48 h, permeability was $17.33\times10^6$ mD before sealing, and permeability was 109.20 mD after injection.

Application Example 3

The present disclosure further provides a method for applying a temperature-resistant and salt-resistant modified graphite-coated soft particle as a profile control and water shutoff agent. The temperature-resistant and salt-resistant modified graphite-coated soft particles of 1.0 mm-1.6 mm prepared in Example 3 were selected for a fracture sealing experiment, a salinity of simulated formation water was 200,000 mg/L (wherein 73282 mg/L sodium ions, 6000 mg/L calcium ions, and 1000 mg/L magnesium ions), the size of a rock core fracture was 10 mm, an injection volume was 1 FV, an injection aging temperature was 150° C., an aging time was 48 h, permeability was $42.35\times10^6$ mD before sealing, and permeability was 279.47 mD after injection.

Application Example 4

The present disclosure further provides a method for applying a temperature-resistant and salt-resistant modified graphite-coated soft particle as a profile control and water shutoff agent. The temperature-resistant and salt-resistant modified graphite-coated soft particles of 1.0 mm-1.6 mm prepared in Example 3 were selected for a fracture sealing experiment, a salinity of simulated formation water was 200,000 mg/L (wherein 73282 mg/L sodium ions, 6000 mg/L calcium ions, and 1000 mg/L magnesium ions), the size of a rock core fracture was 15 mm, an injection volume was 1 FV, an injection aging temperature was 150° C., an aging time was 48 h, permeability was $214.61\times10^6$ mD before sealing, and permeability was 319.55 mD after injection.

Application Example 5

The present disclosure further provides a method for applying a temperature-resistant and salt-resistant modified graphite-coated soft particle as a profile control and water shutoff agent. The temperature-resistant and salt-resistant modified graphite-coated soft particles of 0.3 mm-0.5 mm prepared in Example 4 were selected for a fracture sealing experiment, a salinity of simulated formation water was 200,000 mg/L (wherein 73282 mg/L of sodium ions, 6000 mg/L of calcium ions, and 1000 mg/L of magnesium ions), the size of a rock core fracture was 5 mm, an injection volume was 1 FV, an injection aging temperature was 150° C., an aging time was 48 h, permeability was $2.71\times10^6$ mD before sealing, and permeability was 48.77 mD after injection.

Application Example 6

The present disclosure further provides a method for applying a temperature-resistant and salt-resistant modified graphite-coated soft particle as a profile control and water shutoff agent. The temperature-resistant and salt-resistant modified graphite-coated soft particles of 0.3 mm-0.5 mm prepared in Example 5 were selected for a fracture sealing experiment, a salinity of simulated formation water was 200,000 mg/L (wherein 73282 mg/L sodium ions, 6000 mg/L calcium ions, and 1000 mg/L magnesium ions), the size of a rock core fracture was 5 mm, an injection volume was 1 FV, an injection aging temperature was 150° C., an aging time was 48 h, permeability was $2.70\times10^6$ mD before sealing, and permeability was 62.51 mD after injection.

Comparative Example 1

The ethylene propylene diene monomer matrix of Example 1 was selected, i.e., only ethylene propylene diene monomer was included, and the antioxidant, the auxiliary antioxidant, the first modified graphite, the second modified graphite, and the density regulator were not included. Aging was performed at the same temperature and salinity, a quick agglomeration occurred at 0.5 h, and after aging up to 20 days, a rubber particle agglomerate underwent significant oxidative discoloration and started to collapse in volume.

Figure 5:
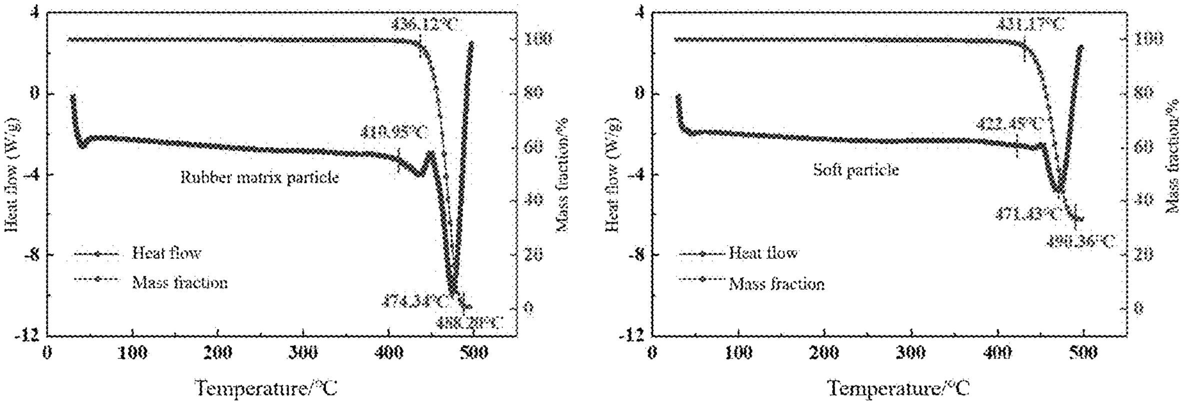
FIG. 5 shows a comparison of thermal stability of a temperature-resistant and salt-resistant modified graphite-coated soft particle prepared using ethylene propylene diene monomer as a main agent in Example 1 with that of an ethylene propylene diene monomer particle of Comparative Example 1.

FIG. 5 shows a comparison of thermal stability of a temperature-resistant and salt-resistant modified graphite-coated soft particle prepared using ethylene propylene diene monomer as a main agent in Example 1 (right diagram) with that of an ethylene propylene diene monomer particle of Comparative Example 1 (left diagram). The temperature-resistant and salt-resistant modified graphite-coated soft particle with the density equal to that of the formation water slowly agglomerating at a high temperature did not show remaining heterogeneous peaks. Comparative example 1 (left diagram) indicates the thermal stability of the rubber matrix, and Example 1 (right diagram) indicates the thermal stability of the coated soft particles, indicating that a mixing effect is good, and neither the density regulator nor the graphite affects the excellent temperature resistance of the rubber particles themselves, and even improves the temperature resistance to a certain extent.

Comparative Example 2

The styrene butadiene rubber matrix of Example 2 was selected, i.e., only styrene butadiene rubber was included, and the antioxidant, the auxiliary antioxidant, the first modified graphite, the second modified graphite, and the density regulator were not included. Aging was performed at the same temperature and salinity, a quick agglomeration occurred at 0.5 h, and after aging up to 35 days, a rubber particle agglomerate underwent significant oxidative discoloration and started to collapse in volume.

Comparative Example 3

The natural rubber matrix of Example 3 was selected, i.e., only natural rubber was included, and the antioxidant, the auxiliary antioxidant, the first modified graphite, the second modified graphite, and the density regulator were not included. Aging was performed at the same temperature and salinity, a quick agglomeration occurred at 0.5 h, and after aging up to 60 days, a rubber particle agglomerate underwent significant oxidative discoloration and started to collapse in volume.

Comparative Example 4

Rubber particles were prepared according to a method the same as that in Example 1, with the difference that: components were different. The ethylene propylene diene monomer matrix of Example 1 was selected, i.e., ethylene propylene diene monomer, the antioxidant, the auxiliary antioxidant, the second modified graphite, and the density regulator was included, and the first modified graphite was not included. Aging was performed at the same temperature and salinity, a quick agglomeration occurred at 0.5 h, but after aging up to 60 days, a rubber particle agglomerate did not undergo significant oxidation.

Comparative Example 5

Rubber particles were prepared according to a method the same as that in Example 2, with the difference that: contents of components were different. The styrene butadiene rubber matrix of Example 2 was selected, i.e., styrene butadiene rubber, the antioxidant, the auxiliary antioxidant, the first modified graphite, the second modified graphite, and the density regulator were included, and the difference was that the content of the first modified graphite was increased to twice the original. Aging was performed at the same temperature and salinity, an agglomeration effect was significantly weakened, and after aging up to 60 days, a rubber particle agglomerate did not undergo significant oxidation.

Comparative Example 6

Rubber particles were prepared according to a method the same as that in Example 3, with the difference that: contents of components were different. The natural rubber matrix of Example 3 was selected, i.e., only the natural rubber, the antioxidant, the auxiliary antioxidant, the first modified graphite, the second modified graphite, and the density regulator were included, and the difference is that the content of the first modified graphite was reduced to half of the original. Aging was performed at the same temperature and salinity, a quicker agglomeration occurred at 10 h, viscoelasticity was significantly reduced, but after aging up to 60 days, a rubber particle agglomerate did not undergo significant oxidation.

Comparative Example 7

Rubber particles were prepared according to a method the same as that in Example 1, with the difference that: the ethylene propylene diene monomer matrix of Example 1 was selected, i.e., the ethylene propylene diene monomer, the antioxidant, the auxiliary antioxidant, the density regulator, and an enhancer were included, but the "enhancer (first modified graphite and second modified graphite) in Example 1" was replaced with "natural nano-graphite without hydrophilic groups on a surface". Due to insufficient hydrophilicity and surface electronegativity, the obtained soft particles are poor in dispersibility in a water body, which affects an injection effect, and an agglomeration speed is shortened to 40 h at a high temperature.

Application Comparative Example 1

A sealing experiment was performed according to a method the same as in Application Example 1, with the difference that they were carbon black-reinforced rubber particles, i.e., the rubber particles prepared in Comparative Example 1 have the permeability of $2.69\times10^6$ mD before sealing and 2831.58 mD after injection.

Application Comparative Example 2

A sealing experiment was performed according to a method the same as in Application Example 2, with the difference that they were carbon black-reinforced rubber particles, i.e., the rubber particles prepared in Comparative Example 2 have the permeability of $17.33\times10^6$ mD before sealing and 36609.62 mD after injection.

Application Comparative Example 3

A sealing experiment was performed according to a method the same as in Application Example 3, with the difference that they were natural rubber particles, i.e., rubber particles prepared in Comparative Example 3 without other additives for mixing floated on the surface of the formation water and were not easy to inject, and a completely plugged sealing effect was formed after 2 h of pre-buried aging in a rock core, causing damage to a reservoir.

Application Comparative Example 4

A sealing experiment was performed according to a method the same as in Application Example 4, with the difference that they were natural rubber particles without other additives for mixing, floated on the surface of the formation water and were not easy to inject, and a completely plugged sealing effect was formed after 2 h of pre-buried aging in a rock core, which makes subsequent injection impossible.

Application Comparative Example 5

The soft particles prepared in Comparative Example 4 were adopted to perform a sealing experiment according to a method the same as that of Application Example 2, due to the absence of an enhancer and the difficulty in injection caused by too quick an agglomeration between the particles, insufficient viscoelasticity led to non-resistance to scouring of formation water, and a sealing effect was poor.

Application Comparative Example 6

The soft particles prepared in Comparative Example 5 were adopted to perform a sealing experiment according to a method the same as that of Application Example 2, the particles lost most of agglomeration capacity due to the excess of enhancer, and the permeability was $17.33\times10^6$ mD before sealing and 32658.22 mD after injection.

Application Comparative Example 7

The soft particles prepared in Comparative Example 6 were adopted to perform a sealing experiment according to a method the same as that of Application Example 2, the particles agglomerated quickly, after aging for 12 h, less enhancer led to insufficient viscoelasticity, which in turn led to a poor sealing effect, and the permeability was $17.33\times10^6$ mD before sealing and 21390.42 mD after injection.

Application Comparative Example 8

The soft particles prepared in Comparative Example 7 were adopted to perform a sealing experiment according toa method the same as that of Application Example 2, since the enhancer no longer gave hydrophilicity and electronegativity to the soft particles, the particles were poor in dispersibility in the formation water, which was unfavorable for injection, and an agglomeration speed was increased, which was unfavorable for deep transport.

In summary, the temperature-resistant and salt-resistant modified graphite-coated soft particles prepared in the present disclosure are adopted. The antioxidant provides one hydrogen atom to a free radical, converting itself into a relatively stable free radical. This process can interrupt a free radical chain reaction, preventing a rubber molecule from being further oxidized and damaged. Since a hindered phenol free radical is stable, it is less prone to triggering a new oxidation reaction, thus effectively preventing oxidation progress. The auxiliary antioxidant is used in synergy with the antioxidant to improve long-term thermal stability of the rubber material. A coating effect of the first modified graphite may retard the agglomeration between the soft particles and prevent the damage to the near-shaft reservoir. The second modified graphite enhances the viscoelasticity of the particles to strengthen the sealing effect, and also has the functions of assisting in density regulation and assisting in dispersion. The density regulator can regulate the density of the rubber particles according to the salinity of the formation water to make it similar to the density of the formation water, achieving a purpose of suspension in the formation water, which is conducive to sustained deep injection under conditions of different salinities of the formation water. The soft particles may agglomerate at the high temperature and high salt for 2 d to form the large-sized high-strength agglomerate that can control water coming out of fractures and vugs with stability of ≥90 days.

Compared with the examples, the aged agglomerate in the above Comparative Examples 1, 2 and 3 are insufficient in stability under the high temperature and high salt because the rubber particles are prone to oxidative damage under the high temperature and high salt due to the absence of the antioxidant and the auxiliary antioxidant, and the absence of the enhancer and the density regulator leads to poor viscoelasticity and dispersibility, which is not conducive to injection and sealing.

Compared with the examples, in the above Comparative Examples 4-7, changes in properties or amount of the enhancer result in poor viscoelasticity/dispersibility of the particles.

Compared with the examples, in the above Comparative Examples 1 and 2, the permeability after sealing is higher, a main reason for the poor sealing effect is that the carbon black reinforced rubber particles do not have the agglomeration capacity and only rely on their own jamming effect, so the small-sized particles are not good in sealing effect.

In the above Application Comparative Examples 3 and 4, because there is no density regulator, the density is too low, and the particles can only agglomerate and float on the surface of the formation water, resulting in unfavorable injection. In addition, there is no modified graphite on the surfaces of the rubber particles to retard the agglomeration between the particles, resulting in an immediate agglomeration between the particles by the influence of the temperature, which leads to sealing of the near-shaft area, resulting in damage to the reservoir, and making it impossible to perform the deep-source water control.

In the above Application Comparative Examples 5-8, due to the differences in ranges and properties of the enhancer and those proposed in the present disclosure, the soft particles may lack in agglomeration/injectability/scaling property, which leads to poor actual injection and scaling effect.

Preferred embodiments of the present disclosure are described in detail above, but the present disclosure is not limited thereto. Within the scope of the technical conception of the present disclosure, a variety of simple variations of the technical solution of the present invention may be made, including the combination of individual technical features in any other suitable manner, and these simple variations and combinations should likewise be regarded as the disclosed contents of the present disclosure, which all fall within the scope of protection of the present disclosure.

The invention claimed is:

1. A modified graphite-coated soft particle, comprising a soft particle and first modified graphite coating on a surface of the soft particle, wherein the soft particle comprises a rubber main agent, an antioxidant, an auxiliary antioxidant, a density regulator, and second modified graphite, and the first modified graphite and the second modified graphite are the same or different and each are modified graphite with a surface rich in hydroxyl groups and carboxyl groups;

wherein a particle size of the modified graphite is 200 nm-1000 nm, a thickness of the first modified graphite coating on the surface of the soft particle is 30 nm-50 μm, and a particle size of the modified graphite-coated soft particle is 200 μm-3.5 mm;

wherein the modified graphite contains oxygen-containing groups, the oxygen-containing groups comprise hydroxyl groups, carboxyl groups, and epoxy groups, and based on a total number of the oxygen-containing groups of the modified graphite, the number of the hydroxyl groups accounts for 30%-60%, the number of the carboxyl groups accounts for 10%-30%, and the number of the epoxy groups accounts for 30%-40%;

wherein based on a total weight of the soft particle, a content of the rubber main agent is 65 wt %-85 wt %, a content of the antioxidant is 0.1 wt %-0.5 wt %, a content of the auxiliary antioxidant is 0.05 wt %-0.3 wt %, a content of the second modified graphite is 5 wt %-10 wt %, and a content of the density regulator is 4 wt %-30 wt %; and wherein the modified graphite-coated soft particle is formed by a method comprising mixing the first modified graphite and water to obtain a first modified graphite dispersion, the first modified graphite dispersion having a concentration of 0.1%-1%; bringing the first modified graphite dispersion and the soft particle into contact, wherein a weight ratio of the amount of the first modified graphite dispersion to the amount of the soft particle is 100:(2-20); and causing the first modified graphite to adhere to the surface of the soft particle under conditions of heating and rotation.

2. The modified graphite-coated soft particle according to claim 1, wherein the thickness of the first modified graphite coating the surface of the soft particle is 80 nm-20 μm.

3. The modified graphite-coated soft particle according to claim 1, wherein the particle size of the modified graphite is 300 nm-800 nm.

4. The modified graphite-coated soft particle according to claim 1, wherein the particle size of the modified graphite is 300 nm-500 nm, or, the particle size of the modified graphite is 500 nm-800 nm.

5. The modified graphite-coated soft particle according to claim 1, wherein based on the total weight of the soft particle, the content of the rubber main agent is 70 wt %-80 wt %, the content of the antioxidant is 0.15 wt %-0.3 wt %, the content of the auxiliary antioxidant is 0.1 wt %-0.2 wt %, the content of the second modified graphite is 7.5 wt %-9 wt %, and the content of the density regulator is 10 wt %-25 wt %.

6. The modified graphite-coated soft particle according to claim 1, wherein the rubber main agent is selected from one or more of natural rubber, styrene butadiene rubber, or ethylene propylene diene monomer;

or, the antioxidant is selected from pentaerythritol bis(2, 6-di-tert-butyl-p-cresol) ester or pentaerythritol tetrakis [3-(3,5-di-tert-butyl-4-hydroxyphenyl)propionate];

or, the auxiliary antioxidant is tris(2,4-di-tert-butylphenyl)phosphite;

or, the density regulator is ceramic sand or steel shots.

7. The modified graphite-coated soft particle according to claim 6, wherein a particle size of the ceramic sand is 45 μm-90 μm.

8. The modified graphite-coated soft particle according to claim 6, wherein a particle size of the steel shots is 45 μm-75 μm.

9. The modified graphite-coated soft particle according to claim 1, wherein the particle size of the modified graphite-coated soft particle is 500 μm-2 mm.

10. A method for preparing the modified graphite-coated soft particle according to claim 1, comprising:

(1) bringing the rubber main agent, the antioxidant, the auxiliary antioxidant, the second modified graphite, and the density regulator into contact for melt mixing to obtain integral rubber;

(2) performing crushing, shearing, and extrusion granulation on the integral rubber to obtain the soft particle; and (3) mixing the first modified graphite and water to obtain the first modified graphite dispersion, bringing the first modified graphite dispersion and the soft particles into contact, and causing the first modified graphite to adhere to the surface of the soft particle under conditions of heating and rotation to obtain the modified graphite-coated soft particle.

11. The method for preparing according to claim 10, wherein in step (1), a condition for the melt mixing comprises: a temperature of 180° C.-350° C.; or, in step (2), a condition for the extrusion granulation comprises: a temperature of 180° C.-350° C.; or, in step (3), the conditions of the heating and rotation comprise: a temperature of 180° C.-200° C. and a rotation rate of 50 rpm-150 rpm; or, in step (3), the weight ratio of the amount of the first modified graphite dispersion to the amount of the soft particles is 100:(5-20).

12. A profile control and water shutoff agent, being the modified graphite-coated soft particle according to claim 1.

13. The profile control and water shutoff agent according to claim 12, wherein the profile control and water shutoff agent has an elastic modulus of 700 kPa-800 kPa and a viscous modulus of 350 kPa-450 kPa at 140° C. and under a condition of a salinity of $20\times10^4$ mg/L; or, a density of the profile control and water shutoff agent is 1 g/cm$^3$-1.2 g/cm$^3$.

14. The profile control and water shutoff agent according to claim 12, wherein the profile control and water shutoff agent is useful in an oil reservoir.

15. The profile control and water shutoff agent according to claim 14, wherein agglomeration of particles of the profile control and water shutoff agent forms a seal in the oil reservoir;

or, conditions of the oil reservoir: a depth of ≥4500 m, a temperature of ≥140° C., and a salinity of $\geq20\times10^4$ mg/L.

16. The profile control and water shutoff agent according to claim 15, wherein the conditions of the oil reservoir: a depth of 4500 m-6500 m, a temperature of 140° C.-200° C., and a salinity of $20\times10^4$ mg/L to $30\times10^4$ mg/L.

* * * * *